Figure 1:
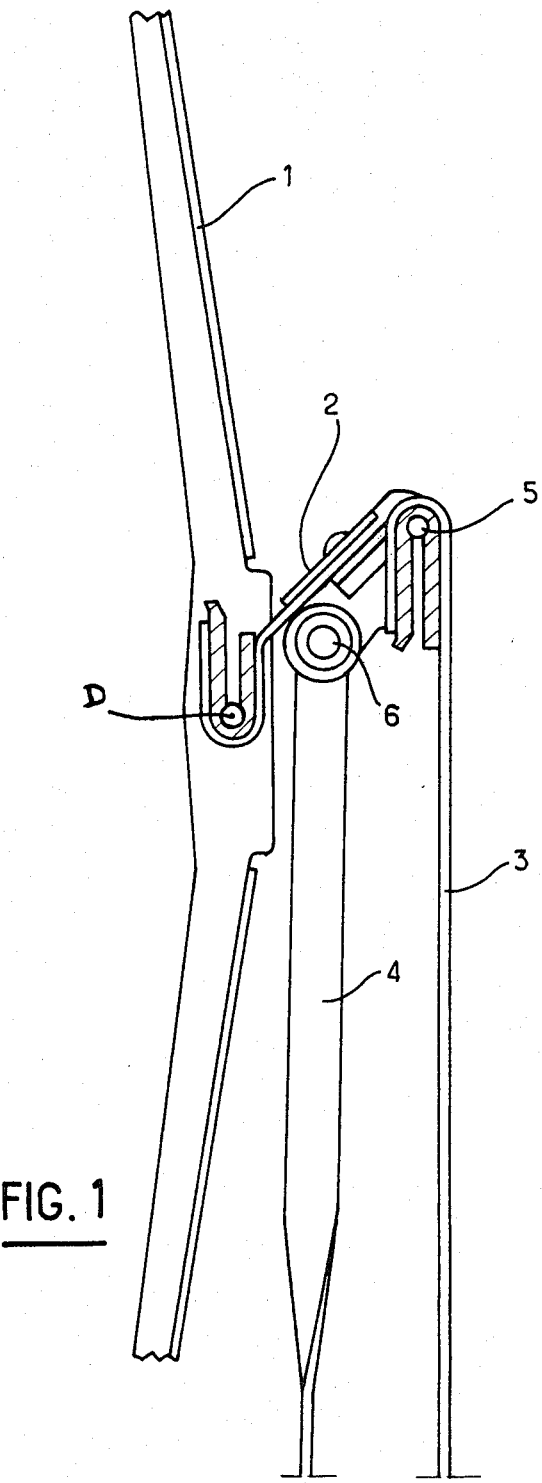

United States Patent [19]

Leroy et al.

[11] Patent Number: 4,525,891
[45] Date of Patent: Jul. 2, 1985

[54] WINDSCREEN WIPER SYSTEM

[76] Inventors: Andre R. Leroy, 64 Chaussee de Binche, Mons-Saint-Symphorien, 7030; Jean-Marie G. Flamme, 22 rue de la Delivrance, Beloil-Stambruges, 7980, both of Belgium

[21] Appl. No.: 504,036
[22] PCT Filed: Sep. 22, 1982
[86] PCT No.: PCT/FR82/00154
§ 371 Date: May 23, 1983
§ 102(e) Date: May 23, 1983
[87] PCT Pub. No.: WO83/01043
PCT Pub. Date: Mar. 31, 1983

[30] Foreign Application Priority Data

Sep. 23, 1981 [BE] Belgium ................................ 5/5235

[51] Int. Cl.³ ............................. B60S 1/34; B60S 1/40; B60S 1/44
[52] U.S. Cl. ............................. 15/250.23; 15/250.32; 15/250.35
[58] Field of Search ............ 15/250.21, 250.23, 250.35, 15/250 A, 250.32

[56] References Cited

U.S. PATENT DOCUMENTS

| 1,660,971 | 2/1928 | Lindner | 15/250.23 |
| 2,286,449 | 6/1942 | Wahlberg | 15/250.23 |
| 2,642,612 | 6/1953 | Smulski | 15/250.35 X |
| 3,831,219 | 8/1974 | Deutscher et al. | 15/250.23 X |
| 3,852,845 | 12/1974 | Quinlan et al. | 15/250.23 |
| 3,893,204 | 7/1975 | Kolb | 15/250.23 |

FOREIGN PATENT DOCUMENTS 1561395 3/1969 France ................................ 15/250.23

Primary Examiner—Peter Feldman
Attorney, Agent, or Firm—Brisebois & Kruger

[57] ABSTRACT

A windscreen wiper system, designed in particular for road vehicles, providing a non-circular path of any one of the points of at least one windscreen wiper blade and comprising a shaft having an alternating rotational movement which drives a main guide arm associated with the said shaft by a pivot joint, characterized in that it comprises, on one hand, a rocker (2) associated with the main guide arm (3) by a further pivot joint and, on the other hand, a secondary guide arm (4) articulated at two of its points, each articulation comprising at least two pivot joints, one of the above-mentioned articulations connecting it to the rocker (2), the blade (1) being articulated by a pivot joint on the rocker (2).

9 Claims, 4 Drawing Figures

WINDSCREEN WIPER SYSTEM

The present invention relates to a windscreen wiper system designed for vehicles, in particular for road vehicles. This system is characterised by a non-circular path of any one of the points of the windscreen wiper(s) associated therewith. A path of this type is designed to improve visibility and cleaning quality with respect to conventional systems having a circular path.

A number of systems having a non-circular path have been proposed. These include in particular the systems described in the French Patent Specification Nos. 2 239 873, 2 194 173, 2 178 682 and 1 178 683. These systems are characterised in particular by the presence of a single blade articulated on a single blade-holder arm whose axis of rotation is displaced.

Other windscreen wiper systems designed to provide a wiping area of rectangular shape have been proposed. These basically involve the systems defined in the patent Nos. 2 131 446 and 2 144 269. The organisation of these systems is substantially different from that described in the patents mentioned in the preceding paragraph. These systems basically contain a guide arm, in addition to a blade and a blade-holder arm. The mechanical arrangement of these elements is such that the articulation of the blade on the blade-holder arm describes a rectilinear path and the guide arm maintains the axis of the blade in fixed direction perpendicular to this path.

None of the systems mentioned above have as yet been put into practice, basically because their construction has proved to be uneconomical, their size prohibitive or their service life problematical.

The invention proposed uses a mechanical arrangement which associates two closed kinematic chains having certain elements in common which constitutes a mechanism having two input movements.

A first kinematic chain is constituted by a shaft rotating with respect to the bodywork, a main guide arm articulated on this shaft via a pivot joint, a rocker articulated on one hand on the guide arm and, on the other hand, on the blade—possibly divided—by means of pivot joints. All the elements of this chain are contained in a plane containing the axis of the shaft or parallel to this shaft. This plane is provided with an oscillating movement by means of the shaft which constitutes the input element of this first kinematic chain.

The second kinematic chain comprises at least one element common to the first chain—the rocker—as well as its own elements—a secondary guide arm articulated at two points thereon, each articulation comprising at least two pivot joints, one of the above-mentioned articulations connecting it to the rocker.

In a first variant, the articulation of the secondary guide arm which does not provide the connection of the said arm with the rocker may connect the said arm to a crankshaft mounted pivotably with respect to the bodywork. The crankshaft then constitutes the second input element of the mechanism. The arrangement of the crankshaft is generally of any type with respect to the axis of the input shaft of the first chain. Consequently, the movement of the secondary guide arm is spatial and takes place outside of the oscillating plane containing the blade.

In the case referred to, in which the blade wipes a plane window screen, perpendicular to the input shaft and parallel to the main guide arm, the function of the first kinematic chain is to set at all times the angular position of the blade, and the function of the second chain is to compel a given point of the blade to describe a path which diverges from a circumference. This spacing is defined by the excentricity of the crankshaft, by the arrangement of the articulations of the rocker and by the articulation of the axes of the shafts of the two kinematic chains.

This provides a first advantage of the invention. As a result of a suitable arrangement of these articulations, an amplification of the movement of the crankshaft is produced which sets the spacing of the circular path. A considerable spacing may be obtained by a low degree of excentricity and the mechanism may be readily embedded in the bodywork.

A second advantage of the invention is provided in that the blade is articulated on a rocker which may be small in size and in that this rocker is articulated on two arms, one of which is directly pivoted on the bodywork. Satisfactory guiding of the blade which is favourable to the quality of the wiping is therefore obtained. This wiping by two arms is obtained without the visibility of the driver being impaired with respect to conventional guide systems. The instantaneous positions of the secondary guide arm in effect have a fairly slight deviation from the main guide arm.

A third advantage of the invention lies in the possibility which the proposed mechanical arrangement offers with respect to obtaining a considerable deviation from the circular path without causing pivoting of the blade about one of its actual points, which is not the case with the majority of the mechanisms proposed up to now.

A fourth advantage of the invention lies in the low weight of the elements of the system which cause the deviations from the circular path. These deviations are thus obtained without producing excessive moments of inertia at high wiping speeds.

In one embodiment, the mechanism of the invention comprises a motor reduction gear and two transmissions associated, on one hand, with the motor reduction gear and, on the other hand, with the two input elements of the mechanism. The transmission which adjusts the oscillation of the main guide arm and the blade, converts the continuous movement of rotation of the motor into an alternating movement of rotation having an amplitude equal to that of the wiping action. The second transmission may be similar to the first. It may also supply a continuous movement of rotation whose frequency is equal or proportional to that of the movement of oscillation of the blade.

In a further embodiment, it is also possible to add two transmissions disposed in series rather than in parallel to the motor reducer gear. One of the transmission then receives its input movement from the other transmission rather than directly from the motor reducer gear.

In a second variant of the system of the invention, and for certain windscreen sizes, the desired effects may be achieved by simplifying the system as follows: the eccentricity of the crankshaft of the second kinematic chain is cancelled out, the movement of this chain and the transmission causing it thus becoming superfluous. The actual elements of the second kinematic chain are then combined in a single secondary guide arm articulated, on one hand, about the rocker and, on the other hand, about an element which is fixed with respect to the bodywork of the vehicle.

In more complex applications, the system of the invention may be used to provide wiping actions with several blades. In these applications, use is made of as many systems as there are non-circular paths to be provided independently.

The drawing shows, by way of example, a particular embodiment of the invention, comprising a single blade and a single main guide arm.

Figure 1A:
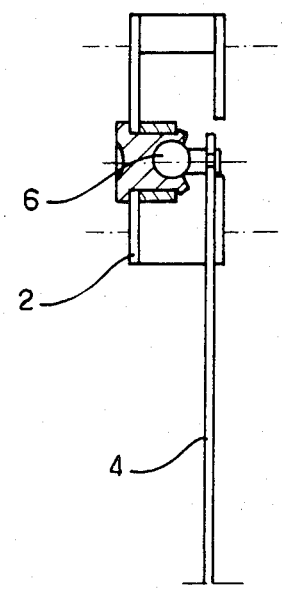
Figure 2:
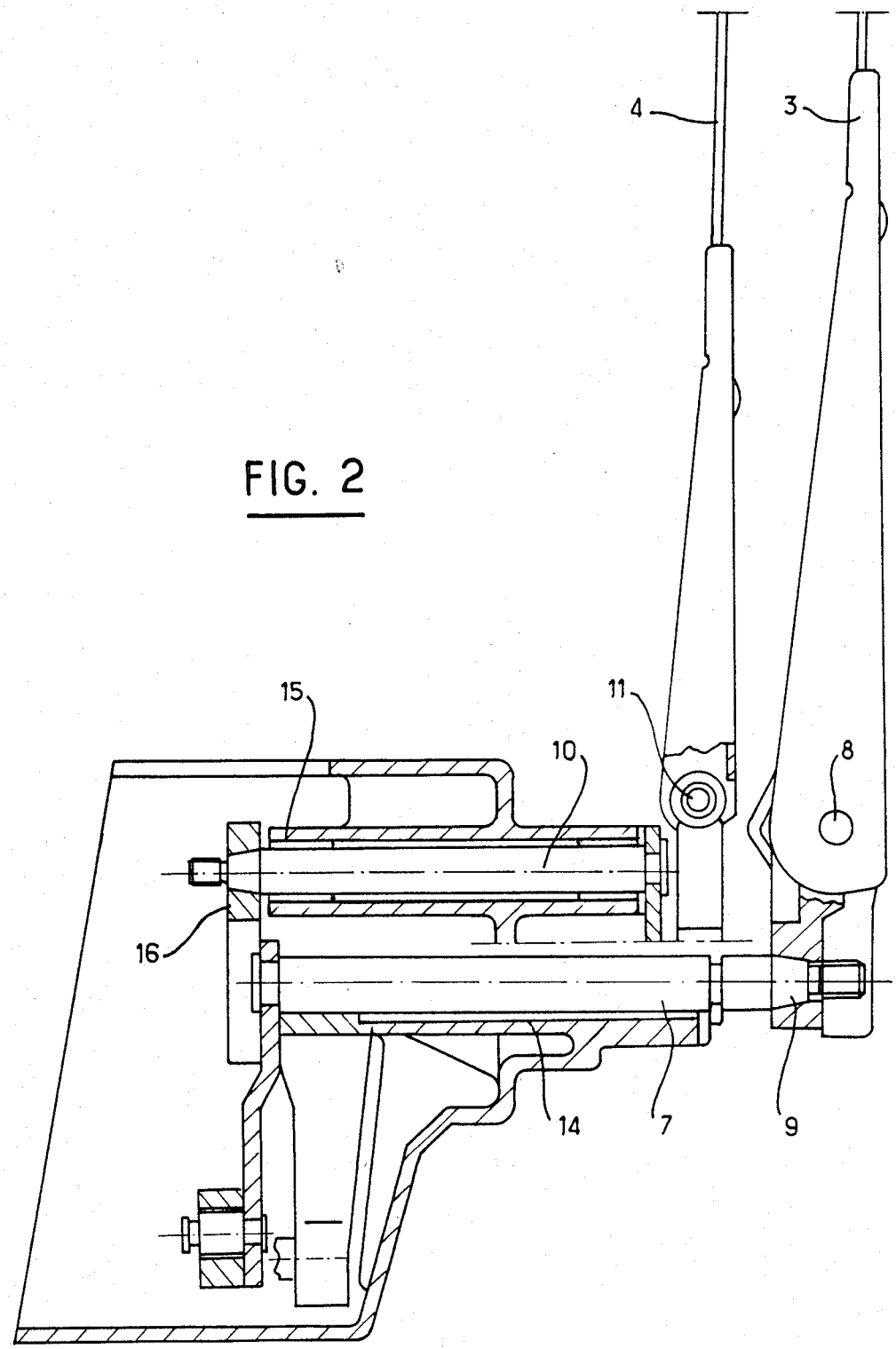
Figure 3:
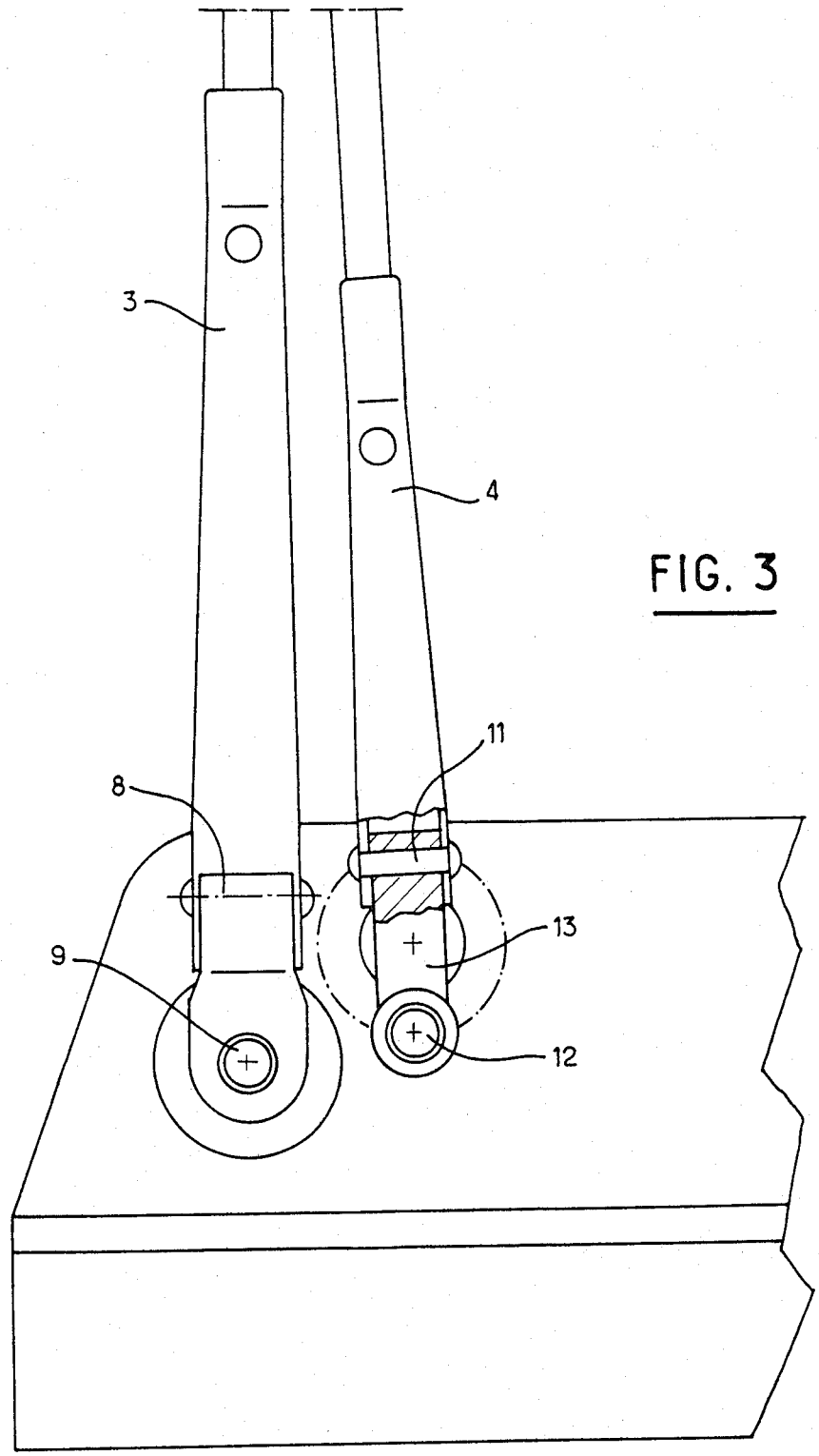

In this drawing:

FIG. 1 shows the upper portion of the system in a plane which is substantially perpendicular to the windscreen reference plane, FIG. 1A shows a detail of the articulation of the secondary guide arm on the rocker, FIG. 2 shows, in part section, the lower portion of the system of FIG. 1, FIG. 3 shows a view of the system of FIGS. 1 and 2 in a plane parallel to the windscreen reference plane.

The blade 1 is mounted in a detachable manner on the rocker 2 by means of a conventional articulation or pivot for pivotal movement about an axis D. The rocker 2 is connected to the guide arms 3 and 4 by the respective articulations 5 and 6. The articulation 5 is a pivot joint having its axis perpendicular to the median plane of the rocker 2. The articulation 6 is a spherical connection. The rocker/blade and rocker/main guide arm articulation or pivot axes are parallel. The articulation point 6 is disposed between the two axes mentioned above (axis D and the axis of pivot 5).

The main guide arm 3 is articulated on the shaft 7 by means of a pivot joint 8 and an assembly 9 secures the arm 3 to shaft 7 as in the case of conventional mechanisms.

The secondary guide arm 4 is articulated on the crankshaft 10 by means of two pivot joints 11 and 12 having perpendicular axes connected by an intermediate lever portion 13.

The shaft 7 and the crankshaft 10 are guided in rotation with respect to the bodywork by pivot guides or bearings 14 and 15. Their movements are synchronised by a transmission 16.

In a variant, the articulation 6 is provided by two pivot joints, one of which is parallel to the axis 5.

As is evident from the description above and the drawings, the outer end of main guide arm 3 is connected to rocker 2 at pivot 5 which constitutes a first pivot connection. Rocker 2 is pivoted to blade 1 at D, which forms a second pivot connection. The pivot 12 between crankshaft 10 and secondary guide arm 4 forms a third pivot connection.

The invention uses a mechanical arrangement which associates two close kinematic chains having certain elements in common which constitutes a mechanism having two input movements.

A first kinematic chain is constituted by the shaft 7 rotating or oscillating which respect to the vehicle body. The main guide arm 3 is connected to this shaft 7 via a pivot joint 8, which is a pivot of the arm 3. The rocker 2 is articulated, on one hand, to the guide arm 4 and, on the other hand, to the blade 1 at pivot D. All the elements of this chain are contained in a plane containing the axis of the shaft 7 or are parallel to this shaft. There is oscillating movement of this plane by means of the shaft 7 which constitutes the input drive of this first kinematic chain.

The second kinematic chain comprises at least one element common to the first chain, namely, the rocker 2, as well as its own elements, which are the secondary guide arm 4 articulated at two points thereon, each articulation comprising two pivot joints, the spherical pivot 6 permitting movement about at least two axes, and the pivots 11 and 12 permitting pivotal movement about two axes.

In a first variation, the articulation 12 of the secondary guide arm connects the arm to a stubshaft of the crankshaft 10 which is mounted to rotate or pivot with respect to the vehicle body. The crankshaft 10 thus constitutes the second input element of the mechanism. The arrangement of the crankshaft 10 is generally parallel with and spaced from the axis of the input shaft 7 of the first chain, as shown at FIGS. 2 and 3. Consequently, the movement of the secondary guide arm 4 is spatial and takes place outside of the oscillating plane containing the blade 1.

Where the blade wipes a plane window screen, perpendicular to the input shaft 7 and parallel to the main guide arm 3, the first kinematic chain determines the angular position of the blade, and the second chain causes a given point of the blade to describe a path which deviates from a circumference or arc having the axis of shaft 8 as its center. This deviation is defined by the eccentricity of the crankshaft 10, by the relative locations of the articulations 5, 6 and D of the rocker, and by the relative locations of the axes of the shafts 7 and 10 of the two kinematic chains.

As a result of a suitable arrangement of these rocker articulations 5, 6 and D, an amplification of the movement of the crankshaft 10 is produced which causes the deviation from the circular path. A considerable deviation can be obtained by a low degree of eccentricity so the mechanism can readily be mounted in the vehicle body.

It will be noted that the blade 1 is articulated on a rocker 2 which can be small in size and that this rocker is articulated on the two arms 3, 4 which are directly pivoted on the vehicle body. The guiding by the two arms 3, 4 is obtained without the visibility of the driver being impaired, relative to conventional guide systems. The instantaneous positions of the secondary guide arm 4 deviate only slightly from the main guide arm.

It is to be appreciated that a considerable deviation from the circular path can be obtained without causing the blade to pivot about a contact point with the windshield, which is not the case with the majority of prior mechanisms.

In one embodiment, the mechanism of the invention comprises a motor reduction gear and two transmissions associated, on one hand, with the motor reduction gear and, on the other hand, with the two shafts 7 and 10 of the mechanism. The transmission which controls the oscillation of shaft 7 and thus the main guide arm 3 and the blade 1, converts the continuous rotation of the motor into an alternating rotation having an amplitude equal to that of the wiping action. The second transmission can be similar to the first and can also provide continuous rotation of crankshaft 10 at a frequency equal to or proportional to the oscillation of shaft 7 and the blade 1.

In a second variation of the system of the invention, and for certain windscreen sizes, the desired effects can be achieved by simplifying the system as follows: the eccentricity of the crankshaft 10 is eliminated, which eliminates the need for driving the crankshaft 10. The actual elements of the second kinematic chain are then combined in a single secondary guide arm 4 articulated at one end to the rocker 2 at pivot 6, and at the other end at pivot 12, to an element which is fixed with respect to the bodywork of the vehicle. The same effect is obtained by locking crankshaft 10 so it cannot rotate.

We claim:

1. Windscreen wiper system for a vehicle, for providing a non-circular wiping path for at least one windscreen wiper blade, comprising a main guide arm, a rocker, means pivotally connecting said rocker to the main guide arm at a first pivot connection for pivotal movement about an axis generally parallel to the windscreen, means pivotally connecting the rocker to a wiper blade at a second pivot connection spaced from and parallel to the first pivot connection, means for connecting the main guide arm to a drive shaft remote from said rocker for oscillating the arm about an oscillation axis to move the wiper blade back and forth across the windscreen, and means for pivoting said rocker about said first pivot connection on said main guide arm, during oscillation of said main guide arm, to displace said second pivot connection and the wiper blade relative to said oscillation axis, said means comprising, a secondary guide arm pivotally connected to said rocker at a location spaced from said first pivot connection, and pivot means for pivotally connecting an end of the secondary guide arm remote from the rocker for pivotal movement about a third pivot connection spaced from said oscillation axis of the main guide arm.

2. A system according to claim 1 wherein said third pivot connection comprises a pivot connection to a rotatable crankshaft on the vehicle.

3. A system according to claim 2, further comprising means for driving said crankshaft.

4. A system as claimed in claim 1 wherein said third pivot connection comprises a pivot fixed with respect to the vehicle.

5. A system as claimed in claim 1 wherein the secondary guide arm is pivotally connected to the rocker at a location between said first and second pivot connections.

6. A system according to claim 1 wherein said third pivot connection comprises an axis parallel to said oscillation axis.

7. A system as claimed in claim 1 wherein the secondary guide arm is pivotally connected to said rocker for pivotal movement about axes which are perpendicular to each other.

8. A system as claimed in claim 7 wherein said second pivot connection comprises an axis in a plane perpendicular to said oscillation axis, and one of the pivot joints of the secondary guide arm on the rocker comprises an axis parallel to the axis of the second pivot connection.

9. A system as claimed in claim 7 wherein the secondary guide arm is pivotally connected to said rocker by a spherical pivot.

* * * * *